(12) United States Patent
Porter et al.

(10) Patent No.: US 6,356,004 B1
(45) Date of Patent: Mar. 12, 2002

(54) COMBINATION BRUSH RETAINER/SPRING ASSEMBLY

(75) Inventors: Eugene B. Porter; Robert L. Burtis, both of Auburn Hills, MI (US); Larry Strausburg, Waynesville, OH (US); Frank Lombardo, Rochester, NY (US); Gary Andrews, Henrietta, NY (US); David Williams, Pavilion, NY (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/628,896

(22) Filed: Jul. 31, 2000

(51) Int. Cl.$^7$ .......................... H01R 39/38; H01R 43/06
(52) U.S. Cl. ............................ 310/239; 310/233; 29/597
(58) Field of Search ............................. 310/236–247, 310/233; 29/597

(56) References Cited

U.S. PATENT DOCUMENTS

| | | | | | |
|---|---|---|---|---|---|
| 1,027,273 A | * | 5/1912 | Nelson | ........................ | 290/22 |
| 4,774,754 A | * | 10/1988 | Steward, Sr. | ................ | 29/596 |
| 4,820,139 A | * | 4/1989 | Tuckey | ...................... | 418/135 |
| 5,130,751 A | * | 7/1992 | Sato et al. | .................... | 399/96 |
| 5,172,465 A | * | 12/1992 | Stewart, Sr. | ................. | 29/597 |
| 5,495,134 A | * | 2/1996 | Rosenblum | ................. | 310/239 |
| 5,821,662 A | * | 10/1998 | Kajino et al. | ............... | 310/239 |
| 5,977,683 A | * | 11/1999 | Scheele et al. | ............. | 310/242 |

FOREIGN PATENT DOCUMENTS

FR         2581260 A1  *  10/1986

* cited by examiner

Primary Examiner—Nestor Ramirez
Assistant Examiner—Guillermo Perez

(57) ABSTRACT

A combination brush retainer/spring assembly for use in a DC motor includes a retaining ring and a conical spring connected together as a single unit. The retaining ring portion is designed to fit in a center hole of a brush holder to retain a plurality of spring-loaded brushes against their spring bias so that an armature shaft and commutator can pass through the center hole without obstruction. When the commutator passes through the center hole, it pushes the retaining ring free, allowing the brushes to spring back toward the center hole to contact the commutator. The spring portion of the assembly has an end that engages with a ball bearing on the armature shaft with enough force to ensure that the armature shaft and ball bearing rotate at the same angular velocity and without slippage.

8 Claims, 4 Drawing Sheets

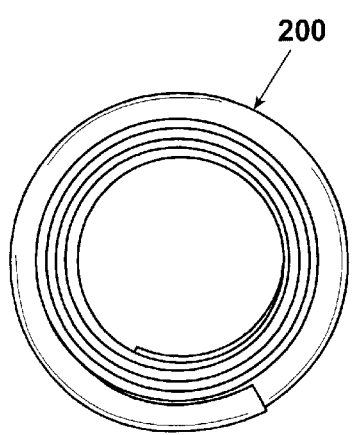 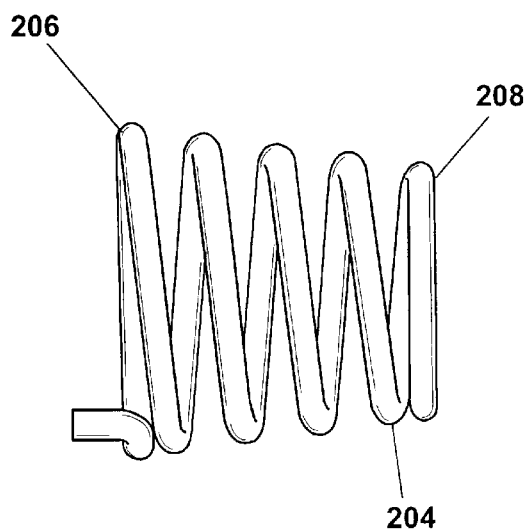
Fig. 3                    Fig. 4

COMBINATION BRUSH RETAINER/SPRING ASSEMBLY

TECHNICAL FIELD

The invention is directed to a brush retainer for a DC motor, and more particularly to a brush retainer that prevents contact between the brushes and a commutator during motor assembly.

BACKGROUND ART

FIG. 1 is an exploded view of a portion of a known motor assembly 100 in which the inventive device will be used. Of particular interest with respect to this application is the interaction between a brush holder 102, brushes (not shown) that are held in the brush holder 102, armature shaft 106, and commutator 108. The brush holder 102 includes a center hole 110 for accommodating the armature shaft 106 and commutator 108 once the motor is completely assembled. The brushes are disposed around the center hole 110 and are spring-biased so that the brushes normally extend into the center hole 110, as is known in the art.

Because the brushes are spring-biased to extend into the center hole 110, positioning the brush holder 102 over the armature shaft 106 requires pushing the brushes against their spring bias with a brush retainer (not shown) to prevent the brushes from obstructing the center hole 110 and then releasing when the commutator 108 is seated in the center hole 110 so that the brushes can contact the commutator 108 firmly.

Current motor structures often position an armature spring (not shown) on the armature shaft 106, which would pass through the center hole 110 during assembly. At times, however, the spring on the armature shaft 106 will contact the brush retainer and moves the retainer as the shaft 106 passes through the center hole 110, releasing the brushes prematurely before the commutator 108 is seated properly within the center hole 110.

There is a need for a device that retains brushes during assembly without experiencing the premature brush release problems of known devices.

SUMMARY OF THE INVENTION

Accordingly, the present invention is a combination brush retainer/spring assembly that includes a retaining ring connected to a spring to form a unitary device. The retaining ring is positioned in a center hole of a brush retainer and holds a plurality of brushes against their spring bias to prevent the brushes from obstructing an armature shaft as it passes through the center hole. Once the commutator is properly seated the center hole, the retaining ring is pushed away by the commutator to release the brushes.

After assembly, the conical spring is disposed on the armature shaft between the retaining ring and a ball bearing that is slip-fitted over the armature shaft. Once the motor is completely assembled, the conical spring is compressed so that a narrow end of the spring engages with an inner race of the ball bearing. The spring force in the conical spring forces the armature shaft and the ball bearing to rotate together at the same angular velocity without any slippage.

By connecting the retaining ring and the conical spring into a single brush retainer/spring assembly, the present invention prevents the brushes from releasing prematurely and blocking the center hole. Further, integrating the conical spring with the retaining ring into a unitary assembly allows the same assembly to retain the brushes and engage with the inner race of the ball bearing, thereby making brush retention more reliable and streamlining the manufacturing process.

BRIEF DESCRIPTION OF THE DRAWINGS

FIG. 3 is a plan view of the assembly shown in FIG. 2;

FIG. 4 is a side view of a spring used in the assembly shown in FIG. 1; and

DETAILED DESCRIPTION OF THE PREFERRED EMBODIMENTS

Figure 1:
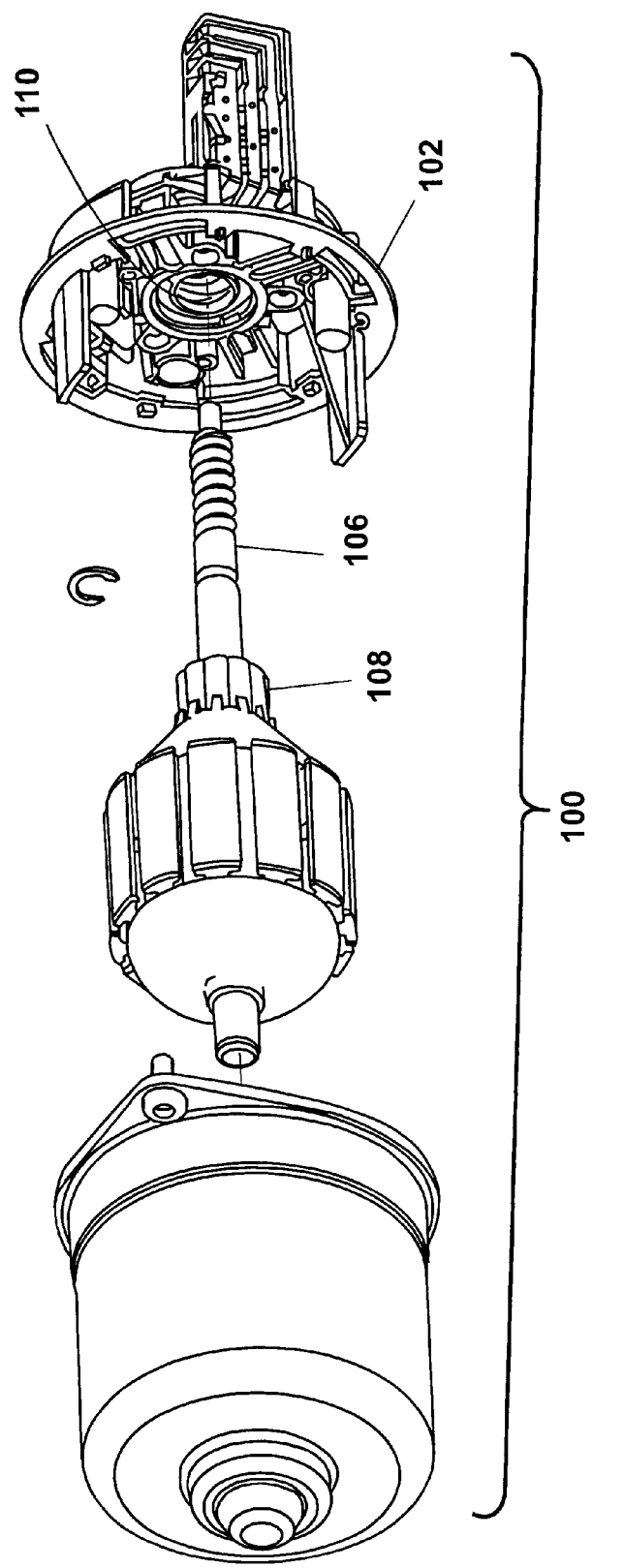
FIG. 1 is an exploded view of a portion of a motor assembly in which the inventive device is to be used.

FIG. 1 is an exploded view of a portion of a known motor assembly 100 in which the inventive device will be used. Of particular interest is the interaction between the brush housing 102, brushes (not shown), armature shaft 106, and commutator 108. The brush housing 102 includes a center hole 110 for accommodating the armature shaft 106 and commutator 108 once the motor is completely assembled. As is known in the art, the brushes are disposed around the center hole 110 and are spring-biased so that the brushes normally extend into the center hole 110.

Figure 2:
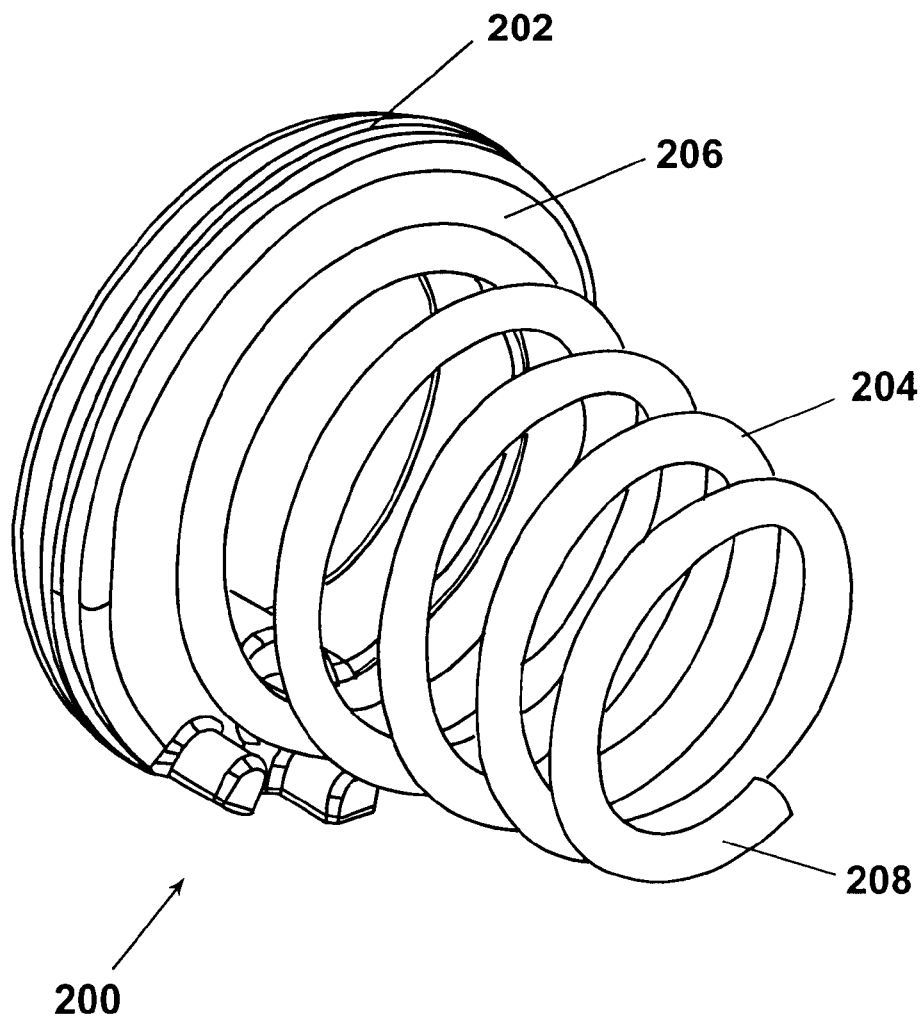
FIG. 2 is a perspective view of a brush retainer/spring assembly according to the present invention.

Referring to FIG. 2, a combination brush retainer/spring assembly 200 according to the present invention is constructed from a retaining ring 202 and a spring 204 that are connected together into a single unit. The retaining ring 202 and spring 204 can be connected by any mechanical or adhesive means that will reliably keep the two pieces together during a manufacturing process. One method is to form resilient tabs on the inner diameter of the retaining ring 202 for engaging with the spring. Other coupling structures or methods can be used to attach the retaining ring 202 to the spring 204 without deviating from the scope of the invention.

A preferred spring 204 structure is shown in FIGS. 2 and 4. Note that although FIGS. 2 and 4 illustrates two slightly different configurations for the end of the spring, these physical variations are not meant to limit the invention in any way and are not significant in the overall inventive structure. FIG. 2 illustrates the spring 204 when it is attached to the retaining ring 202, and FIG. 4 shows a preferred spring 204 structure by itself. As can be seen from the Figures, the spring 204 may have a conical shape with a wide end 206 tapering toward a narrow end 208. The wide end 206 is attached to the retaining ring 202. The spring's diameter at the narrow end 208 should be generally the same diameter as an inner race of a ball bearing on the armature shaft, which will be explained in greater detail below.

Figure 5:
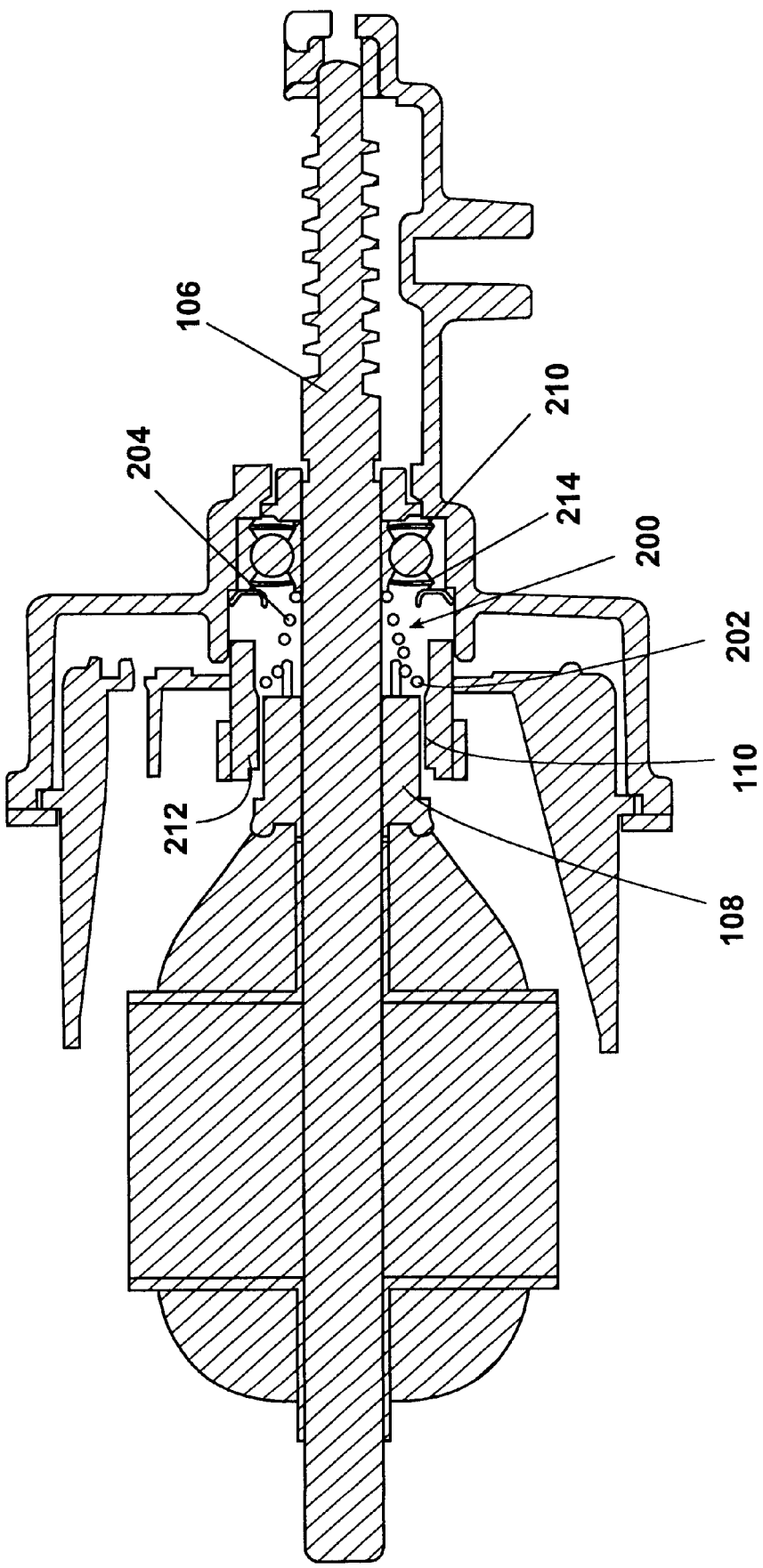
FIG. 5 is a cutaway view of the inventive assembly as it is used in a motor shown in FIG. 1.

FIG. 5 illustrates the brush retainer/spring assembly as it is used in the motor. During the assembly process, the assembly is placed in the center hole 110 of the brush holder 102 to apply pressure against the brushes against their spring-bias and prevent the brushes from obstructing the center hole 110. Because the spring 204 is attached to the retaining ring 202, the spring 204 does not have to be placed on the armature shaft 106 and pass through the retaining ring 202 during the assembly process, thereby eliminating any chance of the retaining ring 202 being prematurely displaced by the spring 204 before the commutator 108 is correctly seated inside the center hole 110.

As can be seen in FIG. 5, the brush retainer/spring assembly 200 is disposed on the armature shaft 106 in between the commutator 108 and a ball bearing 210. When the commutator 108 is correctly seated inside the center hole 110, the commutator 108 will push the retaining ring 202 out of the center hole 110 to release the spring-biased brushes 212 and allow the brushes 212 to rest against the commutator 108. As the spring 204 on the device 200 compresses slightly between the commutator 1 and the ball bearing 210, the narrow end 208 of the spring engages with an inner race 214 of the ball bearing. This engagement ensures that the armature shaft and ball bearing rotate at the same angular velocity without slipping relative to each other.

As a result, the present invention combines a brush retainer with a spring into a single, unitary device so that the same device prevents the brushes from obstructing the center hole during assembly and couples the ball bearing with the armature shaft so that they rotate together. Because the invention combines two functions into one device, the invention streamlines manufacturing and also eliminates the premature brush release problems experienced in the prior art.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A brush retainer assembly for use in a motor assembly, comprising:
   a retaining ring shaped to fit within a center hole of a brush holder, wherein the retaining ring presses the brushes against their spring bias to prevent obstruction of an armature shaft and commutator through the center hole;
   a spring having a first end and a second end, wherein the first end is coupled to the retaining ring and the second end is shaped to engage with an inner race of a ball bearing disposed on the armature shaft.

2. The brush retainer assembly of claim 1, wherein the retaining ring includes at least one tab that engages with the first end of the spring.

3. The brush retainer assembly of claim 1, wherein the spring is a conical spring.

4. The brush retainer assembly of claim 3, wherein the first end of the conical spring has a diameter larger than the second end of the conical spring.

5. A brush retainer assembly for use in a motor assembly having an armature shaft, a brush holder with a center hole for accommodating the armature shaft, a commutator disposed on the armature shaft, a plurality of spring-biased brushes in the brush holder, and a ball bearing fitted over the armature shaft, the brush retainer assembly comprising:
   a retaining ring shaped to fit within the center hole to press against the brushes against their spring bias;
   a spring having a first end and a second end, wherein the first end is coupled to the retaining ring and the second end is shaped to engage with an inner race of the ball bearing, wherein, during motor assembly, the armature shaft and commutator pass through the retaining ring and spring such that the commutator pushes against the retaining ring to release the brushes, and wherein, after assembly, the second end of the spring engages with the inner race of the ball bearing such that the armature shaft and ball bearing rotate together.

6. The brush retainer assembly of claim 5, wherein the retaining ring includes at least one tab that engages with the first end of the spring.

7. The brush retainer assembly of claim 5, wherein the spring is a conical spring.

8. The brush retainer assembly of claim 7, wherein the first end of the conical spring has a diameter larger than the second end of the conical spring.

* * * * *